United States Patent
Ramle et al.

(10) Patent No.: US 10,349,381 B2
(45) Date of Patent: Jul. 9, 2019

(54) METHOD FOR ERROR HANDLING IN A CELLULAR SYSTEM, NETWORK DEVICE, USER EQUIPMENT, COMPUTER PROGRAM AND COMPUTER PROGRAM PRODUCT THEREFORE

(71) Applicant: Telefonaktiebolaget LM Ericsson (publ), Stockholm (SE)

(72) Inventors: Peter Ramle, Mölnlycke (SE); Lars-Bertil Olsson, Angered (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/539,868

(22) PCT Filed: Jan. 22, 2015

(86) PCT No.: PCT/EP2015/051242
§ 371 (c)(1),
(2) Date: Jun. 26, 2017

(87) PCT Pub. No.: WO2016/116157
PCT Pub. Date: Jul. 28, 2016

(65) Prior Publication Data
US 2018/0014276 A1    Jan. 11, 2018

(51) Int. Cl.
*H04W 4/00* (2018.01)
*H04W 68/12* (2009.01)
(Continued)

(52) U.S. Cl.
CPC ........... *H04W 68/12* (2013.01); *H04W 76/18* (2018.02); *H04W 8/12* (2013.01)

(58) Field of Classification Search
CPC ... H04W 68/12; H04W 76/18; H04W 76/027; H04W 8/12
(Continued)

(56) References Cited

U.S. PATENT DOCUMENTS

| 9,549,348 B2 | 1/2017 | Olsson et al. |
| 2013/0235805 A1* | 9/2013 | Yang ..................... H04W 76/10 370/328 |

(Continued)

OTHER PUBLICATIONS

Author Unknown, "Technical Specification Group Core Network and Terminals; Mobility Management Entity (MME)—Visitor Location Register (VLR) SGs interface specification (Release 13)," Technical Specification 29.118, Version 13.0.0, 3GPP Organizational Partners, Dec. 2014, 73 pages.

(Continued)

*Primary Examiner* — Amancio Gonzalez
(74) *Attorney, Agent, or Firm* — Withrow & Terranova, PLLC

(57) ABSTRACT

It is presented a method for error handling during a Mobile Terminated, MT, call to a User Equipment, UE, in a cellular system. The method is performed by a network device being an alternative Mobility Management Entity, MME, of the cellular system. The method comprises the steps of: failing to forward a paging request to a serving MME, at which the UE is registered; and paging the UE using a Circuit Switched, CS, paging. A corresponding network device, User Equipment, computer program and computer program product are also presented.

14 Claims, 6 Drawing Sheets

(51) Int. Cl.
*H04W 76/18* (2018.01)
*H04W 8/12* (2009.01)

(58) Field of Classification Search
USPC .................................................... 455/432.1
See application file for complete search history.

(56) References Cited

U.S. PATENT DOCUMENTS

2014/0106742 A1* 4/2014 Landais ............... H04W 24/04
455/424
2015/0063091 A1* 3/2015 Vesterinen ............. H04W 8/02
370/216

OTHER PUBLICATIONS

Author Unknown, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)," Technical Specification 29.274, Version 12.7.0, 3GPP Organizational Partners, Dec. 2014, 314 pages.

International Preliminary Report on Patentability for International Patent Application No. PCT/EP2015/051242, dated Aug. 3, 2017, 12 pages.

Alcatel-Lucent, "S2-114210: Handling of SGs paging in VLR and MME failure cases," 3rd Generation Partnership Project (3GPP), SA WG2 Meeting #87, Oct. 10-14, 2011, 6 pages, Jeju, South Korea.

Author Unknown, "Technical Specification Group Core Network and Terminals; Study of Evolved Packet Core (EPC) nodes restoration (Release 11)," Technical Report 23.857, Version 11.0.0, 3GPP Organizational Partners, Dec. 2012, 66 pages.

Author Unknown, "Technical Specification Group Core Network and Terminals; Restoration procedures (Release 12)," Technical Specification 23.007, Version 12.7.0, 3GPP Organizational Partners, Dec. 2014, 93 pages.

Author Unknown, "Technical Specification Group Radio Access Network; Evolved Universal Terrestrial Radio Access (E-UTRA); Radio Resource Control (RRC); Protocol specification (Release 12)," Technical Specification 36.331, Version 12.4.0, 3GPP Organizational Partners, Dec. 2014, 410 pages.

Ericsson, "C4-140056: Discussion on SGs and Sv path failure," 3rd Generation Partnership Project (3GPP), TSG CT WG4 Meeting #64, Jan. 20-24, 2014, 6 pages, Guang Zhou, China.

Ericsson, "C4-140523: Enhancement on MSC initiated SGs restoration," 3rd Generation Partnership Project (3GPP), TSG CT4 Meeting #64bis, Change Request 23.007, CR: 0294, Current version: 12.4.0, Mar. 31-Apr. 4, 2014, 4 pages, Dubrovnik, Croatia.

International Search Report and Written Opinion for International Patent Application No. PCT/EP2015/051242, dated Oct. 20, 2015, 14 pages.

* cited by examiner

METHOD FOR ERROR HANDLING IN A CELLULAR SYSTEM, NETWORK DEVICE, USER EQUIPMENT, COMPUTER PROGRAM AND COMPUTER PROGRAM PRODUCT THEREFORE

This application is a 35 U.S.C. § 371 national phase filing of International Application No. PCT/EP2015/051242, filed Jan. 22, 2015, the disclosure of which is incorporated herein by reference in its entirety.

TECHNICAL FIELD

The invention relates to a method, network device, user equipment, computer program and computer program product for error handling during a Mobile Terminated call to a User Equipment in a cellular system.

BACKGROUND

At use of Circuit Switched FallBack, CSFB, or Short Message Service, SMS, over SGs, in a cellular system, a Mobility Management Entity, MME, Packet Switched, PS,- register a User Equipment, UE, and the MME also performs signalling via interface SGs, towards a Mobile Switching Centre, MSC/VLR, to trigger the MSC/VLR to CS-register the UE.

At a Mobile Terminated, MT, call the MSC/VLR informs/instructs the MME via SGs-signalling that the UE has an incoming call, and the MME in turn instructs the UE to perform an access and domain change to the CS access to enable the UE to take the call in the CS access.

An MT call, or an MT SMS, will not succeed e.g. when there is an issue with the communication via SGs or when there is an issue with the MME where the UE is registered. This is addressed by standard.

In 3GPP TS 23.007 chapter 26 a method is described to handle the case when the MSC/VLR where the UE is registered is not able to contact the MME where the UE is registered. The reason for this failure may be either an issue with the communication via SGs or an issue with the MME where the UE is registered. Multiple MME are in this case aggregated in an MME pool. In this situation the MSC/VLR has, according to the standard, an option to send a paging request to an alternative MME in same MME pool.

SUMMARY

However the 3GPP standardized MSC/VLR initiated SGs restoration procedure upon receiving MT call has some issues. The MSC/VLR selects an alternative MME from the MME pool and the alternative MME will perform IMSI paging with the CN domain set to PS. The same issues apply upon receiving an MT SMS.

This will force the UE to reattach to one of MMEs in the same MME pool if the UE is able to respond to the IMSI paging.

The Visitor Location Register, VLR, detection of that the MME which is serving the UE is no longer in service may be caused by that the communication at interface SGs is broken, i.e. transport failure, while the MME is still operating normally. The effect from the standard solution is that ongoing PS service will be destroyed and the Packet Date Network, PDN, connection is deleted which may lead to hanging PDN connections in the network.

The effect is especially unfortunate when the SGs paging is triggered by less important services, such as MT-Unstructured Service Supplementary Data, MT-USSD, and the PS service is more important to the UE.

More important, for UEs in connected mode TS 36.331, chapter 5.3.2 specifies that the UE does not handle the paging message, hence the CSFB service can't be restored at all. Considering the traffic model in Long Term Evolution, LTE, UEs often stay in connected mode. This makes the MSC/VLR initiated SGs restoration procedure upon receiving MT call not to work most of the time.

The possible use of Geo-redundant features for MME pools is in detail described in U.S. Pat. No. 9,549,348 issued Jan. 17, 2017, which claims priority to US provisional application No. 61/918,698. By this use, it is possible for a non-serving MME within an MME pool to get a UE Context Replica comprising a System Architecture Evolution—Temporary Mobile Subscriber Identity, S-TMSI, and Tracking Area Identity, TAI, list, from an MME in the MME pool where the Context Replica is stored.

It is an object of the invention to add robustness to Mobile Terminated calls to a User Equipment in a cellular system.

According to a first aspect, it is presented a method for error handling during a Mobile Terminated, MT, call to a User Equipment, UE, in a cellular system. The method is performed by a network device being an alternative Mobility Management Entity, MME, of the cellular system. The method comprises the steps of: failing to forward a paging request to a serving MME, at which the UE is registered; and paging the UE using a Core Network, CN, domain equal Circuit Switched, CS, paging.

By error handling a MT call in this way extra robustness to a CSFB feature is achieved, such that it will enhance the possibility of reaching a UE at a MT Call or SMS.

The step of paging may comprise paging the UE using a S-TMSI and limit the paging scope by use of a TAI-list from a UE Context Replica. By use of the TAI-list, a limited paging scope to only relevant eNodeBs is achieved, using CN domain equal CS paging.

The step of paging may comprise paging the UE using an International Mobile Subscriber Identity, IMSI, based CN domain equal CS paging to Evolved Node Bs, eNodeBs, of Tracking Areas, TAs, list which is configured to match a Location Area, LA, wherein a Mobile Switching Centre, MSC/VLR, has the UE registered.

The step of paging may comprise paging the UE using an IMSI based CN domain equal CS paging to a combined service area of the MME and the MSC/VLR.

The method may further comprise the steps, being performed by the serving MME, of: receiving an unexpected Extended Service Request, ESR, indicating a response for an MT call; and triggering a recover scenario for handling the UE at the serving MME. By triggering a recover scenario in the serving MME when receiving an unexpected ESR, at least verification is achieved, and otherwise handover is initiated.

The step of triggering may comprise the step of: sending a SGs Application Part, SGsAP, Location Update, LU, message to the MSC/VLR at which the UE is CS registered; and when receiving an MSC/VLR response comprising an SGsAP LU Accept, LUA, message and thereafter an SGsAP paging, continuing processing the MT call or SMS to the UE; when receiving an MSC/VLR response indicating a change of value for the Temporary Mobile Subscriber Identity, TMSI, of the UE, or when not receiving an MSC/VLR response, initiating an IMSI Detach towards the UE 1. By sending a SGsAP LUA message to the MSC/VLR, at least verification is achieved, and otherwise handover is initiated.

The of triggering may comprise the steps of: sending a SGs Application Part, SGsAP, Location Update, LU, message to an alternative MSC/VLR at which the UE is not CS registered; and when receiving an MSC/VLR response comprising an SGsAP LU Accept, LUA, message and thereafter an SGsAP paging, continuing processing the MT call or SMS to the UE; when receiving an MSC/VLR response indicating a change of value for the Temporary Mobile Subscriber Identity, TMSI, of the UE, or when not receiving an MSC/VLR response, initiating an IMSI Detach towards the UE.

The method may further comprise the steps, being performed by another MME, of: receiving an unexpected ESR indicating a response for an MT call; and triggering a recover scenario for handling the UE at the another MME. By triggering a recover scenario in the another MME, when receiving an unexpected ESR, handover is initiated.

According to a second aspect, it is provided a method for error handling during a MT call or SMS to a UE, in a cellular system. The method is performed by a network device being a serving MME, or another MME, of the cellular system. The method comprising the steps of: receiving an unexpected Extended Service Request, ESR, for Circuit Switched FallBack, CSFB, from the UE; and triggering a recover scenario for handling the UE at the network device.

According to a third aspect, it is provided a network device, being an alternative MME, configured to handle an error during a MT call or SMS to a UE, in a cellular system. The network device comprising: a processor; and a computer program product storing instructions that, when executed by the processor, causes the network device to: fail to forward a paging request to a serving MME, at which the UE is registered; and page the UE using a CN domain equal CS paging.

According to a fourth aspect, it is provided a network device configured to handle an error during a MT call or SMS to a User Equipment, in a cellular system. The network device being a serving MME, or another MME, of the cellular system. The network device comprising: a processor; and a computer program product storing instructions that, when executed by the processor, causes the network device to: receive an unexpected ESR for CSFB, from the UE; and trigger a recover scenario for handling the at the network device.

According to a fifth aspect, it is provided a network device configured to handle an error during a MT call or SMS to a UE, in a cellular system. The network device comprising: a determination manager configured to detect failure to forward a paging request to a serving MME, at which the UE is registered; and a page manager configured to page the UE using a CN domain equal CS paging.

According to an eighth aspect, it is presented a computer program for error handling during a MT call or SMS to a UE, in a cellular system. The computer program comprising computer program code which, when run on a network device being an alternative MME of a cellular system, causes the network device to: fail to forward a paging request to a serving MME, at which the UE is registered; and page the UE using a CN domain equal CS paging.

According to a ninth aspect, it is presented a computer program product comprising a computer program and computer readable storage means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

Figure 1:
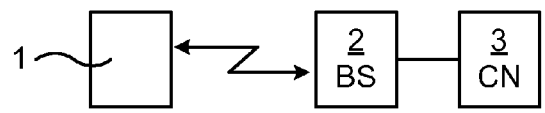
FIG. 1 is a schematic diagram illustrating an environment where embodiments presented herein can be applied.

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

The basic idea to improve robustness for Mobile Terminated, MT, calls and SMSs to a User Equipment, UE is to avoid paging the UE with an International Mobile Subscriber Identity, IMSI, in the Core Network, CN, domain equal Packet Switched, PS, and instead first try to relay the request from the alternative MME to the MME where the UE is registered, i.e. the serving MME. The alternative MME is an MME which the MSC/VLR selects to send a paging request to when the MSC/VLR fail to send paging to the serving MME where the UE is registered. The alternative MME is part of the same MME pool as the serving MME where the UE is registered. If relaying isn't possible, e.g. due to S10 interface failure between the alternative MME and the serving MME where the UE is registered, or failure of the serving MME, then the alternative MME may make use of a Geo-redundant feature in such a way that the UE's replica is fetched and by that the UE's System Architecture Evolution—Temporary Mobile Subscriber Identity, S-TMSI and Tracking Area Identity, TAI,-list. Access to this information enables the alternative MME to page for the UE using S-TMSI and within the TAI-list area. Furthermore, indicating Circuit Switched, CS, domain in the paging request will make the UE respond with an Extended Service Request, ESR, indicating MT CS FallBack, CSFB. Depending on if the serving MME is available to the eNodeB or not, the eNodeB either sends the ESR to the serving MME, or, the eNodeB sends the ESR to another, different but available, MME in the MME pool.

For a scenario where the alternative MME does not have access to Geo-redundant features, the UE may instead be paged using IMSI, and within an area corresponding to either a possible received Location Area Identity, LAI, or to the combined service area of the MME and the MSC/VLR, but still in the CN domain equal CS.

For a scenario where the serving MME is available, receiving such an unexpected ESR message in the serving MME without having first paged the UE for CSFB from the serving MME, will in the serving MME be taken as an indication of a recovery scenario. As a consequence the serving MME then tries to re-establish the signalling association at the interface SGs with the original Mobile Switching Centre, MSC/VLR, which likely is not possible as the SGs interface may still be broken, or with an alternative MSC/VLR in the MSC/VLR pool. By use of either the MT Roaming Retry or the MT Roaming Forward features in the CS domain, the MT call may then proceed.

Even if this signalling recovery causes the MT call/SMS to fail an important effect from this solution is that the MME addresses and resolves the error in time for succeeding calls, and that the restoration is triggered by a MT call/SMS.

If the serving MME is not available then the ESR will be directed to another MME in the MME pool. With or without use of the Geo-redundant feature and from the Geo-redundant feature an access to the S-TMSI and TAI-list of the UE, the services may be recovered, including setup of an SGs association towards the registering MSC/VLR or to an alternative MSC/VLR.

This solution enables recovery from a node failure or a link failure while processing an MT call/SMS. In many cases it may be possible to continue the processing and succeed with preparation of the MT call/SMS at the receiving side, the B number side.

This enables the network to initiate recovery procedures on a need basis instead of initiating recovery procedure pro-actively for all UEs i.e. also for UEs that may not need CS services until after e.g. the SGs interface is restored.

Without use of the Geo-redundant feature and when the ESR is directed to another MME, will cause the ESR to fail and require the UE to re-attach. The delay and signalling impact from processing the re-attach at MME may cause the MT call or SMS to fail but will resolve the error in time for succeeding calls.

A method for error handling during an MT call to a UE 1 in a cellular system will now be described with reference to the drawings.

The environment wherein the MT call is handled is schematically illustrated in FIG. 1, showing a User Equipment, UE, 1 in connectivity with a base station 2, such as an eNodeB in Long Term Evolution, LTE, access network. The base station 2 is in turn connected to a Core Network, CN, 3.

The term User Equipment, may be or alternatively be termed as a mobile communication terminal, mobile terminal, user terminal, user agent, machine-to-machine device etc., and can be, for example, what today are commonly known as a smartphone or a tablet/laptop with wireless connectivity. Moreover, the UE 1 may, but does not need to, be associated with a particular end user. The UE 1 may also be a telematics unit embedded in a vehicle such as a car, bus and truck. The UE 1 may also be a unit mounted in a dashboard of a vehicle for displaying information and communicating with the driver or passengers of the vehicle and being connected to the telematics unit embedded in the vehicle.

The process leading up to the method presented herein is the occurrence of an error. The error occurs during an attempt to perform SGs signalling from an MSC/VLR 14 to a serving MME 11 at an event of an MT call, or MT Short Message Service, SMS, to the UE 1. The Core Network, CN, 3 comprises an MME Pool, and may also comprise an MSC/VLR Pool.

Figure 2:
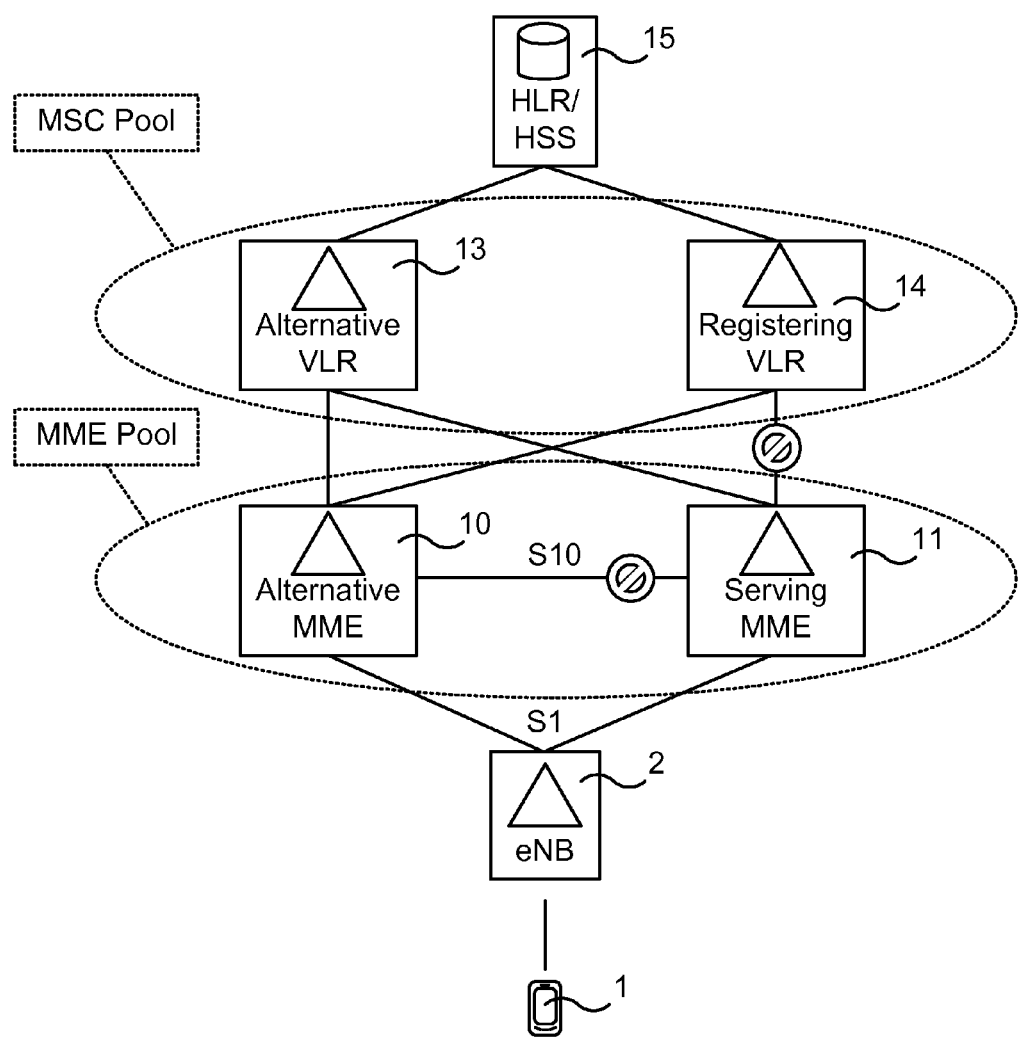
FIG. 2 is a schematic diagram illustrating possible communication interfaces according to an embodiment presented herein.

The MSC/VLR 14, which is handling the MT call, selects an alternative MME 10 from the MME Pool, when it cannot page the serving MME 11. This is schematically illustrated in FIG. 2. The MMEs may be organized serving an MME pool area. The MME pool may in addition be enhanced with the functionality of a Geo-Redundant feature.

The MSC/VLR 14, which is handling the MT call, then sends a paging request for the MT call to a selected alternative MME 10.

The alternative MME 10 then tries to forward the paging request over interface S10 to the serving MME 11 where the UE is registered. This is schematically illustrated in FIG. 2, wherein the S10 interface is broken and the paging request fails. If that serving MME 11 would be available over interface S10 the serving MME 11 would then page the UE 1, according to the current 3GPP standard.

The alternative MME 10, which does not have the UE 1 registered, may retrieve a UE Context Replica, i.e. a copy of the UE context which is saved as a result from use of the Geo-Redundant MME Pool, and by that gets the address of the serving MME 11. This is according to the Geo-Redundant feature. Otherwise the alternative MME 10 directly fails to forward the paging request.

Figure 4A:
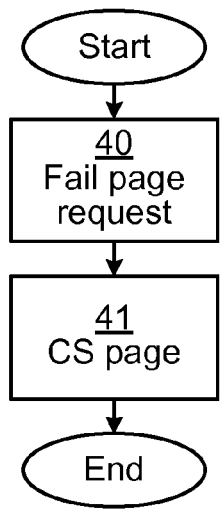
FIGS. 4A-4D are flow charts illustrating methods for embodiments presented herein.

The alternative MME 10 then proceeds as follows:

An embodiment of a method for error handling is shown in FIG. 4A. If the alternative MME 10 is unable to forward the paging request, i.e. fail 40 to forward the paging request to the serving MME 11, the alternative MME 10 pages 41 the UE 1. The paging 41 uses a CN domain equal CS paging, to be able to page the UE 1 without causing the UE 1 to re-attach.

Figure 4B:
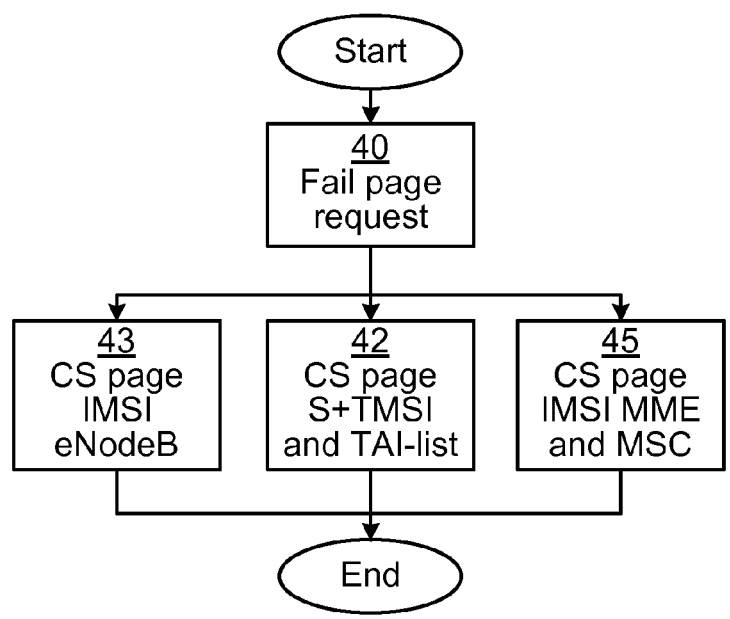

An aspect of the method for error handling is shown in FIG. 4B. The alternative MME 10 may have use of Geo-redundant features, including UE Context Replica, and have in this case tried to forward the paging request to the serving MME 11 and failed due to a broken interface S10. The paging 42 may in this aspect comprise an S-TMSI and a TAI-List from a UE Context Replica in order to be able to page the UE 1 without causing the UE 1 to re-attach, using the S-TMSI for paging, and does so with a limited paging scope, using the TAI-List to select the relevant eNodeBs 2.

The alternative MME 10 thus pages the UE 1 using CS-paging, i.e. the CN domain equal CS.

An aspect of the method for error handling is shown in FIG. 4B. The alternative MME 10 may not have access to S-TMSI and TAI-list, and have in this case not tried to forward the paging request to the serving MME 11 and failed inherently. The alternative MME 10 may in this aspect send an IMSI-based paging 43 to eNodeBs of the tracking areas which are configured to match the Location Area, LA, where the MSC/VLR 14 has the UE 1 registered. The LA for the UE 1 is received from the MSC/VLR 14.

The alternative MME 10 thus pages the UE 1 using CS-paging, i.e. the CN domain equal CS.

An aspect of the method for error handling is shown in FIG. 4B. The alternative MME 10 may not have access to S-TMSI and TAI-list, and have in this case not tried to forward the paging request to the serving MME 11 and failed inherently. The alternative MME 10 has further not received the LA Identity, LAI, for the UE 1 from the MSC/VLR 14. The alternative MME 10 sends an IMSI-based paging 45 to the entire combined service area of MMEs and MSC/VLRs.

The alternative MME 10 thus pages the UE 1 using CS-paging, i.e. the CN domain equal CS.

In one embodiment a method for error handling is shown in FIG. 4 D. When the UE 1 receives 60 a paging request within the CS domain, comprising S-TMSI, it responds by sending 61 a Radio Resource Control, RRC, connection request to the eNodeB 2 and includes a Non-Access Stratum, NAS, ESR, according to the current 3GPP standard.

When the UE 1 receives 62 a paging request within the CS domain, alternatively comprising IMSI, it again responds by sending 61 a Radio Resource Control, RRC, connection request to the eNodeB 2 and includes a Non-Access Stratum, NAS, ESR, according to the current 3GPP standard.

When the UE 1 request reaches the Radio Access Network, RAN, there are two cases:

The serving MME 11 where the UE 1 is registered is available to eNodeB 2 over interface S1-MME, which will be described in more detail in connection with FIG. 2.

The serving MME 11 where the UE 1 is registered is not available to eNodeB 2 over interface S1-MME, which will be described in more detail in connection with FIG. 3.

For the case wherein the serving MME 11 is available:

The eNodeB 2 sends the ESR request to the serving MME 11 where the UE 1 is registered.

Figure 4C:
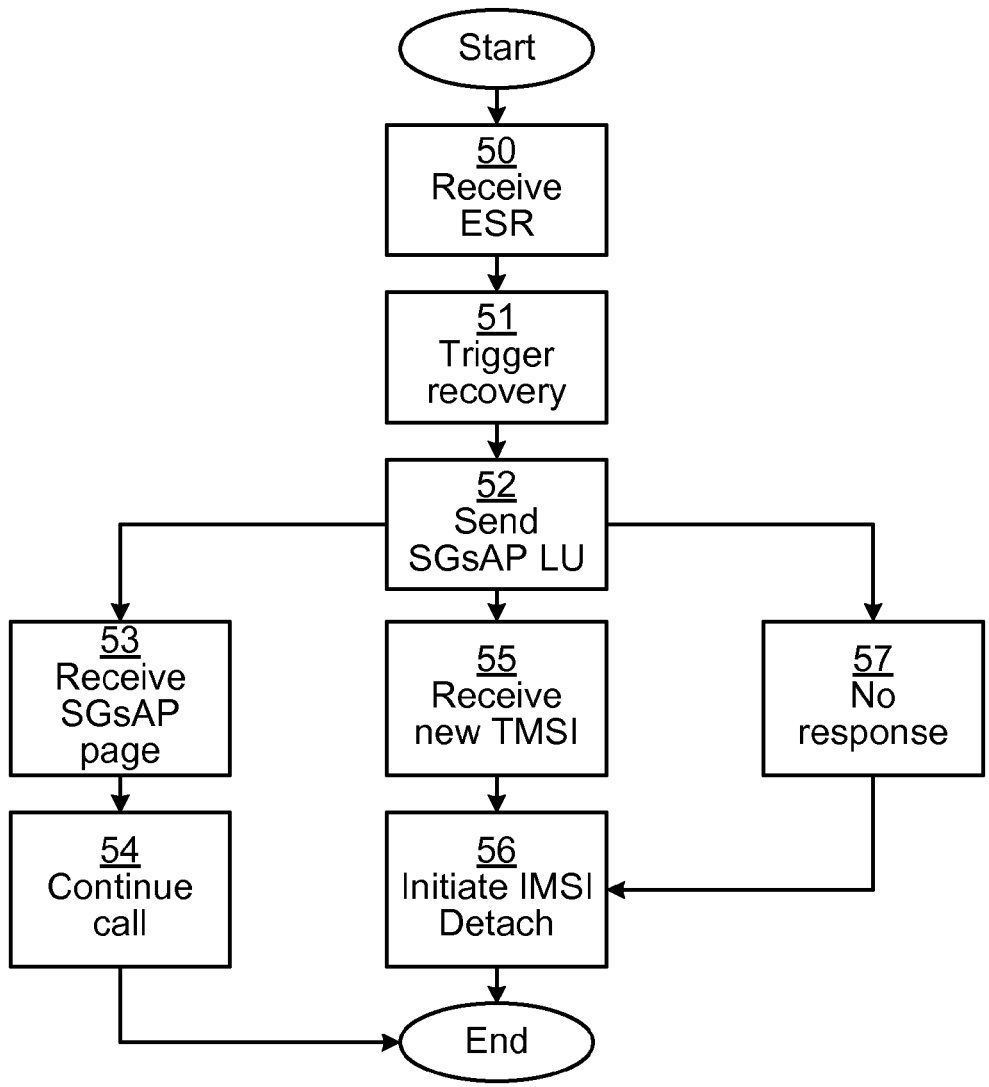
Figure 4D:
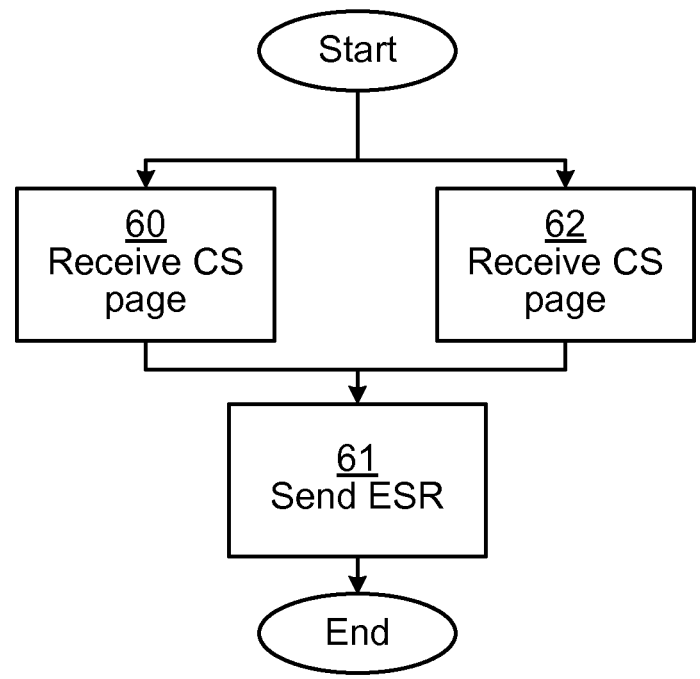

With reference to FIG. 4C, the serving MME 11 receives 50 the unexpected ESR, indicating a response for an MT call. This is according to the current 3GPP standard.

The unexpected ESR for MT call triggers 51 the serving MME 11 to start recovery.

For recovery, the serving MME 11 continues by verifying connectivity status of the SGs connection for the UE 1 by sending 52 a message SGsAP Location Update, LU, to the MSC/VLR 14 where the UE 1 is CS-registered.

If the serving MME 11 receives 53 an MSC/VLR response SGsAP LU Accept, LUA, and later an SGsAP Paging, it's an indication of that the SGs interface is not broken any longer and that it therefore may continue to be used, and handling of the MT call/SMS is continued 54.

If the serving MME 11 receives 55 a response SGsAP LUA from MSC/VLR 14 that indicates a change of value for TMSI, the value must be updated at the UE 1. The serving MME 11 then starts 56 the update sequence by performing IMSI detach towards the UE 1.

If the serving MME 11 does not receive 57 a response, within a reasonable timeout (such as according to the standard), from the MSC/VLR 14, it's an indication of that the SGs interface is still broken and as a result the UE 1 must be registered by an alternative MSC/VLR 13. The serving MME 11 then starts 56 this sequence by performing IMSI Detach towards the UE 1. The UE 1 will in this way be registered by an alternative MSC/VLR.

If the communication error in interface SGs is at the transport layer, then the error is already known from the inherent secure transport of the Stream Control Transmission Protocol, SCTP, and its heartbeat supervision.

If the communication error in the interface SGs is at the application layer, e.g. the SGsAP protocol, it's a matter of protocol configuration of SGsAP protocol timeout in MME.

The alternative MSC/VLR 13 thereafter repeats the SGsAP Paging and the MT call, or MT SMS, processing continues.

There may however be an issue with the registered MSC/VLR 14 where the UE 1 is registered, in that some of its SGs are not working correctly, but some other of its SGs to one or more MME within the same MME pool are working correctly.

The serving MME 11 may instead send 52 a SGs Application Part, SGsAP, Location Update, LU, message to an alternative MSC/VLR 13 at which the UE 1 is not CS registered.

If the serving MME 11 receives 53 an MSC/VLR response comprising an SGsAP LU Accept, LUA, message and thereafter an SGsAP paging, the processing of the MT call or SMS to the UE 1 continues 54.

If the serving MME 11 receives 55 an MSC/VLR response indicating a change of value for the Temporary Mobile Subscriber Identity, TMSI, of the UE 1, or if not receiving 57 an MSC/VLR response, the serving MME 11 initiates 56 an IMSI Detach towards the UE 1.

For the case wherein the serving MME 11 is not available:

The eNodeB 2 sends the ESR request to another MME 12 where the UE 1 is not registered. This is according to the current 3GPP standard.

The another MME 12 receives 50 the unexpected ESR and identifies it is as from a UE 1 not registered by the another MME 12 and starts the Geo-Redundant MME Pool logic when that is available.

If the Geo-Redundant feature is not supported then the another MME 12 will reject the NAS ESR and request the UE 1 to re-attach. As a result the UE 1 will make a combined TA/LA Update request.

A recovery scenario is started 51 at the another MME 12 which either creates or verifies the UE registration at an MSC/VLR.

The another MME 12 creates or verifies the UE registration at MSC/VLR by sending 52 a message SGsAP LU to the MSC/VLR 14 where the UE 1 is CS-registered. This is valid provided that Geo-redundant features are available for the another MME 12, such that the identity of the registered MSC/VLR 14 is known, or that an IMSI hash is available to point to the registered MSC/VLR 14. Otherwise an alternative MSC/VLR 13 may be selected and MT Roaming Retry, MTRR, or MT Roaming Forward, MTRF, is applied in the CS domain for the alternative MSC/VLR 13.

If the another MME 12 receives 53 an MSC/VLR response SGsAP LUA, and later an SGsAP Paging, it's an indication of that the SGs interface is not broken and that it therefore may continue 54 to be used to process the MT call or SMS to the UE 1.

If the another MME 12 receives 55 the response, SGsAP LUA, from MSC/VLR 14 indicating a change of value for TMSI, the value must be updated at the UE 1. The another MME 12 starts 56 the update sequence by performing IMSI detach towards the UE 1.

If the another MME 12 does not receive 57 a response, within a reasonable timeout (such as according to the standard), from the MSC/VLR, it's an indication of that the SGs interface is broken and as a result that the UE 1 must be registered by an alternative MSC/VLR 13. The another MME 12 starts 56 this sequence by performing IMSI Detach towards the UE 1, which causes a combined TA/LA update, which in turn produces an LU and LUA, as well as MTRR or MTRF in the CS domain.

The alternative MSC/VLR 13 thereafter repeats the SGsAP Paging and the MT call or SMS, processing continues.

There may however be an issue with the MSC/VLR 14 where the UE 1 is registered, in that some of its SGs are not working correctly, but some other of its SGs to one or more MME within the same MME pool are working correctly.

The another MME 12 may instead send 52 a SGs Application Part, SGsAP, Location Update, LU, message to an alternative MSC/VLR 13 at which the UE 1 is not CS registered.

If the another MME 12 receives 53 an MSC/VLR response comprising an SGsAP LU Accept, LUA, message and thereafter an SGsAP paging, the processing of the MT call or SMS to the UE 1 continues 54.

If the another MME 12 receives 55 an MSC/VLR response indicating a change of value for the Temporary Mobile Subscriber Identity, TMSI, of the UE 1, or if not receiving 57 an MSC/VLR response, the another MME 12 initiates 56 an IMSI Detach towards the UE 1.

FIG. 2 illustrates when the serving MME 11 is accessible over the S1-MME interface for the eNodeB 2, but not over the S10 interface for the alternative MME 10. Further, the SGs interface between registering MSC/VLR 14 and serving MME 11 is still broken.

When the registering MSC/VLR 14 detects that the serving MME 11 is not reachable during an MT call or SMS, an alternative MME 10 of a number of MME in the MME pool, is selected with a paging request sent via interface SGs. The alternative MME 10 detects that the serving MME 11 is unreachable over Sin and instead sends the page request, with CN domain equal CS, to the UE 1 via interface S1-MME and the eNodeB 2. The UE 1 sends an ESR to eNodeB 2 and eNodeB 2 sends it to the serving MME it. The unexpected ESR request triggers the serving MME 11 to start recover of the SGs association by trying to send a LU to the registering MSC/VLR 14. Upon failure thereof, the serving MME sends the LU request to an alternative MSC/VLR 13. The LU request triggers the alternative MSC/VLR 13 to start either the MT Roaming Retry or the MT Roaming Forward procedure, resulting in a transfer of the MT call to the alternative MSC/VLR. A new paging request is sent to the serving MME 11 and the MT call process will thereby continue. The MSC/VLRs 13 and 14 are related to the HLR 15.

Figure 3:
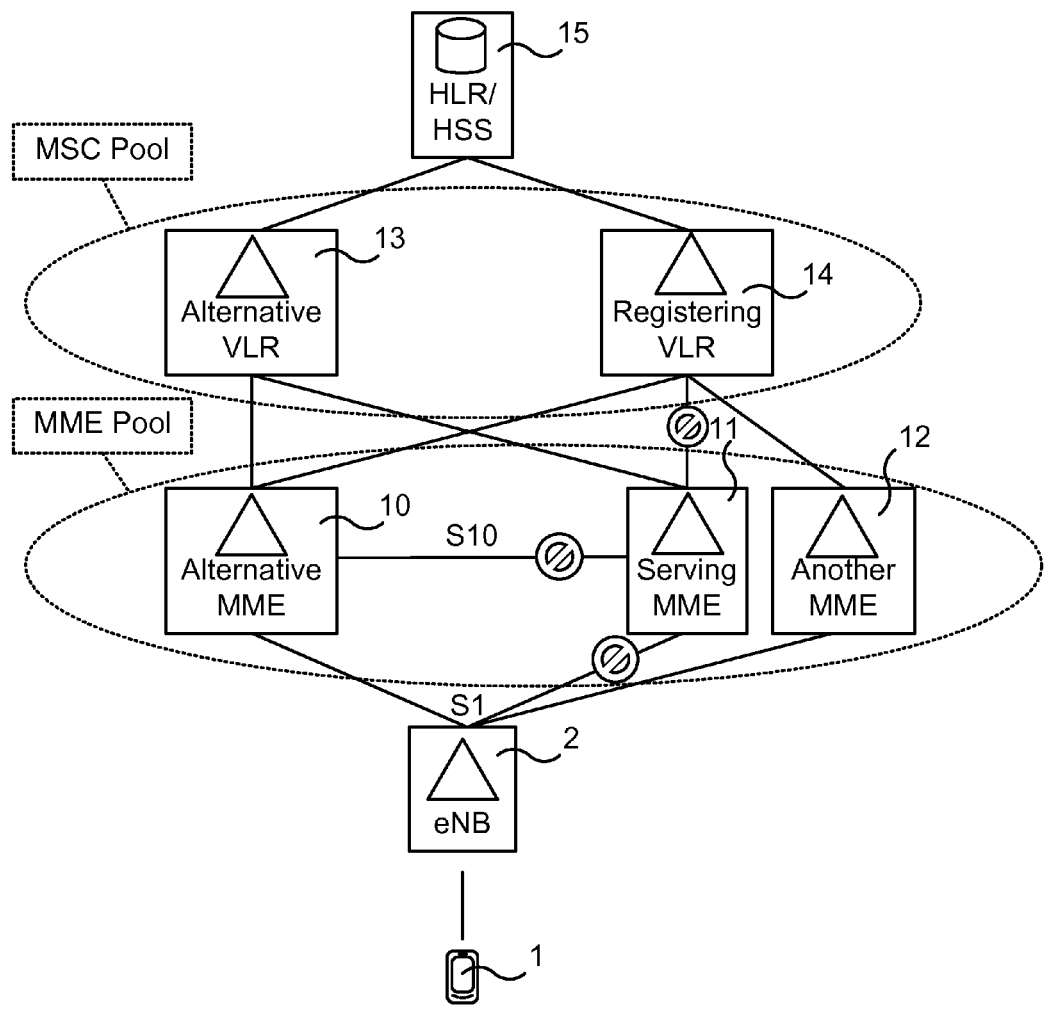
FIG. 3 is a schematic diagram illustrating possible communication interfaces according to an embodiment presented herein.

FIG. 3 illustrates when the serving MME 11 is neither accessible over the S1-MME interface for the eNodeB 2 nor over the S10 interface for the alternative MME 10. Further, the SGs interface between registering MSC/VLR 14 and serving MME 11 is still broken.

When the registering MSC/VLR 14 detects that the serving MME 11 is not reachable during an MT call, an alternative MME 10 of a number of MME in the MME pool, is selected with a paging request sent via interface SGs. The alternative MME 10 detects that the serving MME 11 is unreachable over S10 and instead sends the page request, with CN domain equal CS, to the UE 1 via interface S1-MME and the eNodeB 2. The UE 1 sends an ESR to eNodeB 2 and eNodeB 2 sends it to the another MME 12. The ESR request from an unknown UE 1 triggers the another MME 12 to start the geo-redundant MME pool logic when the Geo-redundant feature is used, whereby the UE gets registered in the another MME 12.

Figure 5:
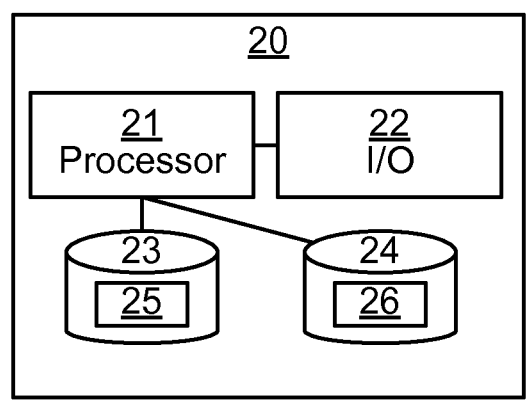
FIG. 5 is a schematic diagram illustrating some components/devices of a network device.

A network device 20 is illustrated in FIG. 5. The network device is configured to handle an error during a MT call to a UE 1 in a cellular system. The network device 20 comprises a processor 21; and a computer program product 23. The computer program product storing instructions that, when executed by the processor 21, causes the network device 20 to:

fail 40 to forward a paging request to a serving MME 11, at which the UE 1 is registered, due to S10 failure; and page 41 the UE 1 using a CN domain equal CS paging.

The processor 21 may be provided using any combination of one or more of a suitable central processing unit (CPU), multiprocessor, microcontroller, digital signal processor (DSP), application specific integrated circuit etc., capable of executing software instructions of a computer program 23 stored in a memory. The memory can thus be considered to be or form part of the computer program product 23. The processor 21 may be configured to execute methods described herein with reference to FIGS. 4A-4D.

The memory may be any combination of read and write memory (RAM) and read only memory (ROM). The memory may also comprise persistent storage, which, for example, can be any single one or combination of magnetic memory, optical memory, solid state memory or even remotely mounted memory.

A second computer program product in the form of a data memory 24 may also be provided, e.g. for reading and/or storing data during execution of software instructions in the processor 21. The data memory 24 can be any combination of read and write memory (RAM) and read only memory (ROM) and may also comprise persistent storage, which, for example, can be any single one or combination of magnetic memory, optical memory, solid state memory or even remotely mounted memory. The data memory 24 may e.g. hold other software instructions 26, to improve functionality for the network device 20.

The network device 20 may further comprise an I/O interface 22 including e.g. a user interface. Other components of the network device 20 are omitted in order not to obscure the concepts presented herein.

Figure 6A:
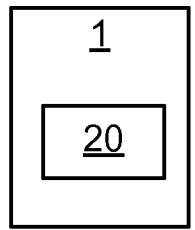
FIGS. 6A-6B are schematic diagrams illustrating various locations where the network device of FIG. 5 can be implemented.

The network device 20 is in an embodiment implemented in the UE 1, which is illustrated in FIG. 6A.

Figure 6B:
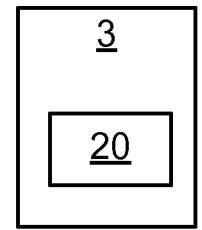

The network device 20 is in an embodiment implemented in the CN 3, such as in or by an MME, which is illustrated in FIG. 6B. The network device 20 may be a serving MME 11, an alternative MME 10 or another MME 12.

Figure 7:
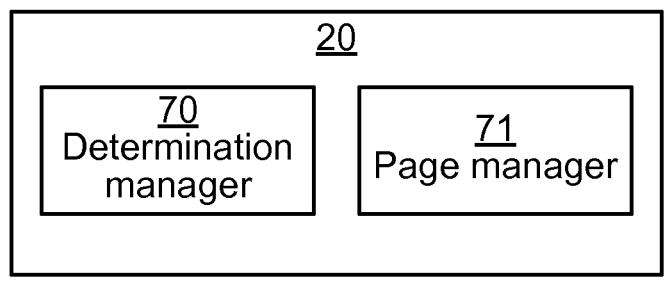
FIG. 7 is a schematic diagram showing functional modules of a network device.

FIG. 7 is a schematic diagram showing functional blocks of the network device 20. The functional blocks may be implemented as only software instructions such as a computer program executing in the network device or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the steps in the methods illustrated in FIGS. 4A-4B, comprising a determination manager 70 and a page manager 71. In the embodiments where one or more of the modules are implemented by a computer program, then it shall be understood that these modules do not have to correspond to programming modules, but can be written as instructions according to the programming language in which they would be implemented, since some programming languages do not typically contain programming modules.

The determination manager 70 is configured to detect failure to forward a paging request to a serving MME 11, at which the UE 1 is registered. This module corresponds to the fail step 40 of FIGS. 4A and 4B. This module can e.g. be implemented by the processor 21 of FIG. 5, when running the computer program The page manager 71 is configured to page the UE 1 using a CS paging. This module corresponds to the page step 41 of FIG. 4A and page steps 42, 43 and 45 of FIG. 4B. This module can e.g. be implemented by the processor 21 of FIG. 5, when running the computer program.

The paging may comprise an S-TMSI and TAI-list from a UE Context Replica.

The paging may comprise an International Mobile Subscriber Identity, IMSI, based CN domain equal CS paging to an Evolved Node B, eNodeB, of a Tracking Area, TA, which is configured to match a Location Area, LA, wherein a Mobile Switching Centre, MSC/VLR, 14 has the UE registered.

The paging may comprise an IMSI based CN domain equal CS paging to a combined service area of the MME and the MSC/VLR.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for error handling during a Mobile Terminated, MT, call or Short Message Service, SMS, to a User Equipment, UE, in a cellular system, the method being performed by a network device being an alternative Mobility Management Entity, MME, of the cellular system and comprising the steps of:
   failing to forward a paging request to a serving MME, at which the UE is registered; and paging the UE using a Core Network, CN, domain equal Circuit Switched, CS, paging, wherein the step of paging comprises paging the UE using a System Architecture Evolution-Temporary Mobile Subscriber Identity, S-TMSI, and limiting the paging scope by use of a Tracking Area Identity, TAI, list from a UE Context Replica.

2. The method according to claim 1, further comprising the steps of, being performed by the serving MME:
   receiving an unexpected Extended Service Request, ESR, indicating a response for the MT call; and
   triggering a recover scenario for handling the UE at the serving MME.

3. The method according to claim 2, wherein said step of triggering comprises the steps of:
   sending a Signaling Gateways, SGs, Application Part, SGsAP, Location Update, LU, message to a Mobile Switching Center, MSC/VLR, at which the UE is CS registered; and
   when receiving a MSC/VLR response comprising an SGsAP Location Update Accept, LUA, message and thereafter an SGsAP paging, continuing processing the MT call or SMS to the UE;
   when receiving a MSC/VLR response indicating a change of value for the Temporary Mobile Subscriber Identity, TMSI, of the UE, or when not receiving a MSC/VLR response, initiating an International Mobile Subscriber Identity, IMSI, Detach towards the UE.

4. The method according to claim 2, wherein said step of triggering comprises the steps of:
   sending a Signaling Gateways, SGs, Application Part, SGsAP, Location Update, LU, message to an alternative Mobile Switching Center, MSC/VLR, at which the UE is not CS registered; and
   when receiving a MSC/VLR response comprising an SGsAP Location Update Accept, LUA, message and thereafter an SGsAP paging, continuing processing the MT call or SMS to the UE;
   when receiving a MSC/VLR response indicating a change of value for the Temporary Mobile Subscriber Identity, TMSI, of the UE, or when not receiving a MSC/VLR response, initiating an International Mobile Subscriber Identity, IMSI, Detach towards the UE.

5. The method according to claim 1, further comprising the steps of, being performed by another MME:
   receiving an unexpected Extended Service Request, ESR, indicating a response for the MT call; and
   triggering a recover scenario for handling the UE at the another MME.

6. The method according to claim 5, wherein said step of triggering comprises the steps of:
   sending a Signaling Gateways, SGs Application Part, SGsAP, Location Update, LU, message to a Mobile Switching Center, MSC/VLR, at which the UE is CS registered; and
   when receiving a MSC/VLR response comprising an SGsAP Location Update Accept, LUA, message and thereafter an SGsAP paging, continuing processing the MT call or SMS to the UE; or
   when receiving a MSC/VLR response indicating a change of value for the Temporary Mobile Subscriber Identity, TMSI, of the UE, or when not receiving a MSC/VLR response, initiating an International Mobile Subscriber Identity, IMSI, Detach towards the UE.

7. The method according to claim 5, wherein said step of triggering comprises the steps of:
   sending a Signaling Gateways, SGs Application Part, SGsAP, Location Update, LU, message to an alternative Mobile Switching Center, MSC/VLR, at which the UE is not CS registered; and
   when receiving a MSC/VLR response comprising an SGsAP Location Update Accept, LUA, message and thereafter an SGsAP paging, continuing processing the MT call or SMS to the UE;
   when receiving a MSC/VLR response indicating a change of value for the Temporary Mobile Subscriber Identity, TMSI, of the UE, or when not receiving a MSC/VLR response, initiating an International Mobile Subscriber Identity, IMSI, Detach towards the UE.

8. A method for error handling during a Mobile Terminated, MT, call or Short Message Service, SMS, to a User Equipment, UE, in a cellular system, the method being performed by a network device being a serving Mobility Managing Entity, MME, or another MME, of the cellular system and comprising the steps of:
   receiving an unexpected Extended Service Request, ESR, for Circuit Switched FallBack, CSFB, from the UE; and
   triggering a recover scenario for handling the UE at the network device, where triggering further comprises;
   sending a Signaling Gateways, SGs, Application Part, SGsAP, Location Update, LU, message to the Mobile Switching Center, MSC/VLR, at which the UE is Circuit Switched, CS, registered; and
   when receiving a MSC/VLR response comprising an SGsAP paging, continuing processing the MT call or SMS to the UE;
   when receiving a MSC/VLR response indicating a change of value for the Temporary Mobile Subscriber Identity, TMSI, of the UE, or when not receiving an MSC/VLR response, initiating an International Mobile Subscriber Identity, IMSI, Detach towards the UE.

9. A network device, being an alternative Mobility Management Entity, MME, configured to handle an error during a Mobile Terminated, MT, call or Short Message Service, SMS, to a User Equipment, UE, in a cellular system, the network device comprising:

a processor; and a computer program product storing instructions that, when executed by the processor, causes the network device to:

fail to forward a paging request to a serving MME, at which the UE is registered; and page the UE using a Core Network, CN, domain equal Circuit Switched, CS, paging, wherein the instruction to page comprises a System Architecture Evolution-Temporary Mobile Subscriber Identity, S-TMSI, and limits the paging scope by use of a Tracking Area Identity, TAI, list from a UE Context Replica.

10. A network device configured to handle an error during a Mobile Terminated, MT, call or Short Message Service, SMS, to a User Equipment, UE, in a cellular system, the network device being a serving Mobility Managing Entity, MME, or another MME, of the cellular system, the network device comprising:

a processor; and a computer program product storing instructions that, when executed by the processor, causes the network device to:

receive an unexpected Extended Service Request, ESR, for Circuit Switched FallBack, CSFB, from the UE; and trigger a recover scenario for handling the UE at the network device, wherein the instruction to trigger comprises the instructions to:

send a Signaling Gateways, SGs, Application Part, SGsAP, Location Update, LU, message to a Mobile Switching Centre, MSC/VLR, at which the UE is Circuit Switched, CS, registered; and when receiving a MSC/VLR response comprising an SGsAP paging, continue processing the MT call or SMS to the UE;

when receiving a MSC/VLR response indicating a change of value for the Temporary Mobile Subscriber Identity, TMSI, of the UE, or when not receiving a MSC/VLR response, initiate an International Mobile Subscriber Identity, IMSI, Detach towards the UE.

11. The network device according to claim 10, wherein the instruction to trigger comprises the instructions to:

send a SGsAP LU message to an alternative MSC/VLR at which the UE is not CS registered; and when receiving a MSC/VLR response comprising an SGsAP paging, continue processing the MT call or SMS to the UE;

when receiving a MSC/VLR response indicating a change of value for the TMSI of the UE, or when not receiving a MSC/VLR response, initiate an IMSI Detach towards the UE.

12. A network device configured to handle an error during a Mobile Terminated, MT, call or Short Message Service, SMS, to a User Equipment, UE, in a cellular system, the network device comprising:

a determination manager configured to detect failure to forward a paging request to a serving Mobility Management Entity, MME, at which the UE is registered; and a page manager configured to:

page the UE using a Core Network, CN, domain equal Circuit Switched, CS, paging, wherein the CS paging comprises a System Architecture Evolution-Temporary Mobile Subscriber Identity, S-TMSI; and limit a paging scope using a Tracking Area Identity, TAI, list from a UE Context Replica.

13. A non-transitory computer program product for error handling during a Mobile Terminated, MT, call or Short Message Service, SMS, to a User Equipment, UE, in a cellular system, the non-transitory computer program product comprising computer program code which, when run on a network device being an alternative Mobility Management Entity, MME, of a cellular system, causes the network device to:

fail to forward a paging request to a serving MME, at which the UE is registered; and page the UE using a Core Network, CN, domain equal Circuit Switched, CS, paging, wherein paging the UE comprises paging the UE using a System Architecture Evolution-Temporary Mobile Subscriber Identity, S-TMSI, and limiting a paging scope using a Tracking Area Identity, TAI, list from a UE Context Replica.

14. The non-transitory computer program product according to claim 13 further comprising a computer readable storage means on which the non-transitory computer program product is stored.

* * * * *